US012561765B2

(12) United States Patent
Yun

(10) Patent No.: US 12,561,765 B2
(45) Date of Patent: Feb. 24, 2026

(54) METHOD OF PERFORMING L0 SMOOTHING ON THE BASIS OF DEEP GRADIENT PRIOR INFORMATION TO IMPROVE SHARPNESS

(71) Applicant: FOUR BY FOUR INC., Seoul (KR)

(72) Inventor: Jun Ho Yun, Gimpo-si (KR)

(73) Assignee: FOUR BY FOUR INC. (KR)

( * ) Notice: Subject to any disclaimer, the term of this patent is extended or adjusted under 35 U.S.C. 154(b) by 335 days.

(21) Appl. No.: 18/035,107

(22) PCT Filed: Jun. 20, 2022

(86) PCT No.: PCT/KR2022/008725
§ 371 (c)(1),
(2) Date: May 2, 2023

(87) PCT Pub. No.: WO2022/270854
PCT Pub. Date: Dec. 29, 2022

(65) Prior Publication Data
US 2024/0005454 A1     Jan. 4, 2024

(30) Foreign Application Priority Data
Jun. 23, 2021     (KR) ........................ 10-2021-0081510

(51) Int. Cl.
$G06T\ 5/70$          (2024.01)
$G06T\ 5/60$          (2024.01)
(Continued)

(52) U.S. Cl.
CPC .................. *G06T 5/70* (2024.01); *G06T 5/60* (2024.01); *G06T 5/73* (2024.01); *G06V 10/454* (2022.01); *G06T 2207/20192* (2013.01)

(58) Field of Classification Search
CPC .... G06T 5/60; G06T 5/70; G06T 5/73; G06T 2207/20193; G06V 10/454
See application file for complete search history.

(56) References Cited

FOREIGN PATENT DOCUMENTS

CN          112526517 A          3/2021
JP          2013521919 A          6/2013
(Continued)

OTHER PUBLICATIONS

Yang, et al. Sparse gradient regularized deep Retinex Network for Robust Low-Light Image Enhancement. (Year: 2021).*
(Continued)

*Primary Examiner* — Daniel G Mariam
(74) *Attorney, Agent, or Firm* — Renaissance IP Law Group LLP

(57)          ABSTRACT

In an embodiment of the present inventive concept, there is provided an $\ell 0$ smoothing method performed on the basis of deep gradient prior information to improve sharpness of an image by an image quality improving device, and the method comprises: a gradient-improved image generation step of generating a gradient-improved image by minimizing the gradients of pixels of an original image, by the image quality improving device; and a smoothing-improved image generation step of generating a smoothing-improved image smoothing-processed through one-step ($\ell_0$) estimation on the gradient-improved image, by the image quality improving device.

4 Claims, 6 Drawing Sheets

(51) Int. Cl.
  *G06T 5/73*          (2024.01)
  *G06V 10/44*         (2022.01)

(56)                References Cited

FOREIGN PATENT DOCUMENTS

| KR | 950024507 A  | 8/1995  |
|----|--------------|---------|
| KR | 100213039 B1 | 8/1999  |
| KR | 100685568 B1 | 2/2007  |
| KR | 102342940 B1 | 12/2021 |

OTHER PUBLICATIONS

Sun, et al. Blind deblurring and denoising via a learning deep CNN denoiser prior and an adaptive L0-regularized gradient prior for passive millimetre-wave images. (Year: 2020).*

Luo, et al. A Deep optimization approach for image deconvolution. (Year: 2019).*

Xu, et al. Image smoothing via L0 gradient minimization (Year: 2011).*

International Search Report for PCT/KR2022/008725, mailed Sep. 29, 2022.

* cited by examiner (a)

METHOD OF PERFORMING L0 SMOOTHING ON THE BASIS OF DEEP GRADIENT PRIOR INFORMATION TO IMPROVE SHARPNESS

BACKGROUND

Field of the Inventive Concept

The present disclosure relates to a method of performing a smoothing process on the basis of deep gradient prior information to improve sharpness.

Background of the Related Art

Recently, computer vision technology is actively used as a method for detecting, monitoring, and determining boundaries of objects in the fields of autonomous driving, satellite, CCTV, and the like. However, due to the limitation in the image signal processing hardware, thermal noise and loss of high-frequency information occur in the image acquisition process and generate degradation, and it lowers quality of an image and generates a problem of degrading performance of computer vision-based methods.

For this reason, a method of removing unnecessary information other than the main edges is required in various fields such as low-illuminance image improvement, fog image restoration, image synthesis, and the like, which are preprocessing methods performed on the basis of computer vision to improve performance, and several edge preservation methods are studied currently.

As existing signal processing methods, methods such as a bilateral filter, a guided image filter, a weighted median filter (WMF), and a joint guided filter are widely used in local-based edge preservation methods. The bilateral filter and the WMF are proposed as a method for solving the problem of losing high-frequency components in the main edges, which is generated in the existing average, median, and Gaussian filters.

The bilateral filter is a method of combining spatial and intensity kernels, and plays a role of removing unnecessary information using the spatial kernel and preserving main edges using the intensity kernel. However, there is a problem in that the computation is very complicated according to the mask size, and the smoothing performance also varies according to adjacent pixels and setting parameters.

In addition, although the guided image filter and the joint guided filter, which belong to the image smoothing method, are less affected by the window size than the bilateral filter and show good performance owing to improved computational complexity, they are disadvantageous in that there is a limit in the smoothing performance due to a given guided image and parameters, and performance of the edge preservation filter is uncertain at the main edges.

The WMF is a method for improving the median filter, and it solves the problems of distortion and noise amplification generated in the median filter according to the filter size, and removes unnecessary information such as noise or the like while preserving the edges in a method of assigning a weight according to the distance in the WMF.

Methods such as L0 and L1-norm based, and weighted least square smoothing have been proposed as a method used in the global-based edge preservation method. These global-based methods acquire a result of preserving edges while minimizing an objective function. These methods preserve edges in a minimization method that adds regularization terms L0, L1, and L2-norm as a constraint to the objective function. The global-based edge preservation method is a method that uses the half-quadratic splitting and iterative shrinkage-thresholding algorithms to effectively preserve the edges in a method of minimizing the constraint regularization terms. Compared to the local-based method, the global-based method is an effective method that solves the problem of losing high-frequency information for the main edges.

However, as there is a problem in that the amount of computation increases as the image size increases, processing speed needs to be improved. In addition, the Cho's method has proposed an improved L0-norm smoothing method that is robust to noise as a simple approach that adds a directional differential operator to the L0-norm smoothing. In addition, the improved L0-norm smoothing solves the problem of increasing the amount of computation as it divides an image into blocks and processes the existing 5-direction gradient including x and y directions in parallel in a computation environment using a GPU.

However, there is a problem in that the 5-direction gradient for improving the smoothing performance further increases computational complexity of block processing. The structure-guided $\ell_0$-optimization method is a method using guided images and proposes a method of preserving unnecessary edges, rather than an existing $\ell_0$-norm minimization method. However, although the edge preservation performance is higher than that of an existing $\ell_0$-norm method owing to two $\ell_0$-norm regularization terms, there is a problem in that it is inefficient in terms of processing speed due to the increased amount of computation.

Recently, learning-based methods are also studied actively, and edge preservation methods using convolutional neural networks are proposed. They are solutions to the processing speed problem that occurs in the existing local and global methods, and show performance comparable to the performance of the local and global filters owing to accelerated operations. A deep joint image filtering method provides a smoothed result by inputting guidance and input images into a deep network in a way similar to the guided filter. The method of convolutional neural pyramid for image processing shows a smoothed result by variously utilizing low and high-level features through an intermediate structure such as u-net as the deep network. As it learns features of various scales using a pyramid structure in comparison with the existing deep joint image filtering method, it can provide an improved edge preservation result. In addition, the method of image smoothing via unsupervised learning proposes an edge preservation method using unsupervised learning, unlike the method introduced above. Although this method shows performance comparable to the result of existing supervised learning, there is a disadvantage in that the method does not learn well compared to the fully-supervised learning method due to the characteristics of the unsupervised learning method. The learning-based method is a method that learns end-to-end the result of an existing edge preservation method, such as L0-norm, by using a convolutional neural network, and it improves the processing speed problem generated by increase in the amount of computation that occurs in the global-based method.

However, due to the learning method based on the mean square error, additional degradation occurs in a result image, and there is a limit in the performance of edge preservation.

Several edge preservation methods are studied, and methods for removing unnecessary information and reducing loss of high-frequency components are developed currently.

However, there are still limitations in the computational complexity and edge-preserving performance in the existing methods.

(Patent Document 0001) Korean Patent Registration No. 10-0213039

SUMMARY

Therefore, the present inventive concept has been made in view of the above problems, and it is an object of the present inventive concept to provide a gradient minimization method using a deep neural network in order to remove unnecessary information and reduce loss of high-frequency components.

To accomplish the above object, according to one aspect of the present inventive concept, there is provided an $\ell 0$ smoothing method performed on the basis of deep gradient prior information to improve sharpness of an image by an image quality improving device, the method comprising: a gradient-improved image generation step of generating a gradient-improved image by minimizing gradients of pixels of an original image, by the image quality improving device; and a smoothing-improved image generation step of generating a smoothing-improved image smoothing-processed through one-step ($\ell_0$) estimation on the gradient-improved image, by the image quality improving device.

The gradient-improved image generation step may include: a critical edge area exclusion step of excluding a critical edge area of the original image; and a gradient minimization step of minimizing a horizontal gradient and a vertical gradient using a GNet, which is a convolutional neural network, for an image excluding the critical edge area.

The GNet may be a convolutional neural network configured of 3×3 convolution, 5×5 convolution, and Rectified Linear Unit (ReLU) filters.

When f denotes an image layer, i denotes a layer before passing through the GNet, k denotes a layer after passing through the GNet, b denotes a bias, * denotes a convolution operator, and h denotes a weight, the gradient minimization step may be performed by processing the formula of $f_i^k = \text{ReLU}(b_i^k + \Sigma_j f_j^{k-1} * h_{i,j}^k)$.

The smoothing-improved image generation step may include the steps of: calculating a loss function, which is a function showing a difference between an original image and a gradient-improved image; and generating a smoothing-improved image by reducing the loss function.

According to an embodiment of the present inventive concept, a gradient may be quickly and accurately minimized by a simple method of using convolution and residual operators, and the problem of an inefficient gradient estimation method that occurs in the existing methods can be solved.

In addition, according to an embodiment of the present inventive concept, existing image smooth filters have high computational complexity due to optimization through iterative operations such as a weighted least squares algorithm, or L0 or L1-based gradient descent, whereas in the present inventive concept, a rapid smoothing process can be performed as a one-step smoothing process is performed.

BRIEF DESCRIPTION OF THE DRAWINGS

FIG. 3 is a view showing the GNet structure of the present inventive concept.

DETAILED DESCRIPTION OF THE PREFERRED EMBODIMENT

Figure 1:
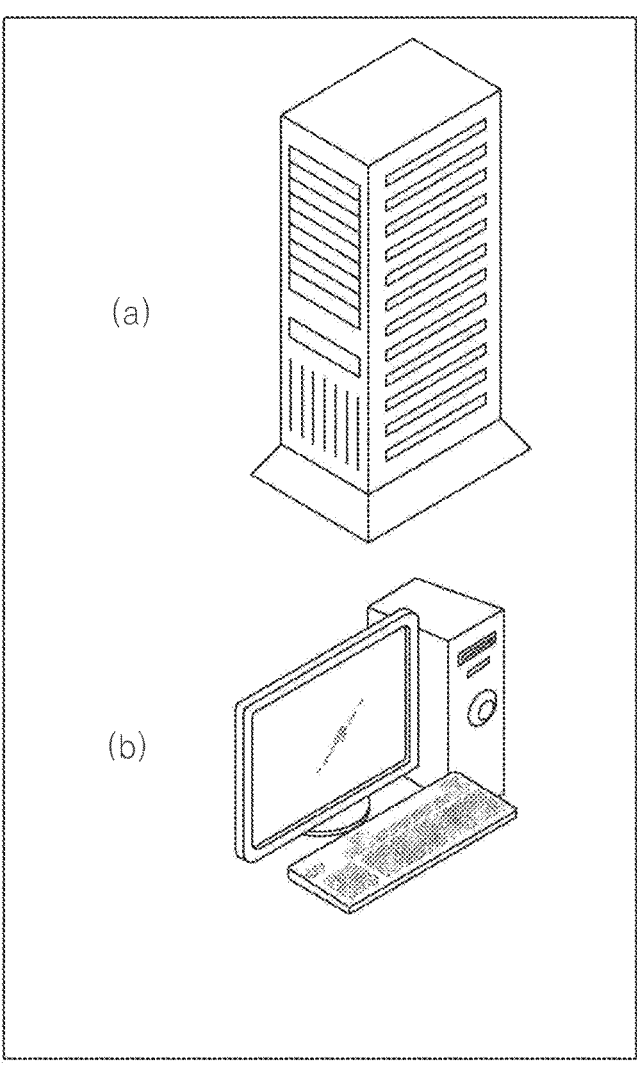
FIG. 1 is a perspective view showing an image quality improving device that performs an $\ell_0$ smoothing process based on deep gradient prior information to improve sharpness according to an embodiment of the present inventive concept.

Hereinafter, the advantages and features of the present inventive concept, and a method for achieving them will become apparent with reference to the embodiments described below in detail, together with the accompanying drawings. However, the present inventive concept is not limited to the embodiments disclosed below, and may be implemented in various different forms. The present inventive concept is provided to fully inform the scope of the present inventive concept to those skilled in the art, and the present inventive concept is only defined by the scope of the claims. In addition, in describing the present inventive concept, when it is determined that related known techniques or the like may blur the gist of the present inventive concept, the detailed description thereof will be omitted.

Hereinafter, a picture quality improving filter used to improve picture quality as known will be briefly described, before describing the present inventive concept.

(1) Image Quality Improvement Based on Local-Based Filter

Local-based filters typically include weighted median, bilateral, and guided filters. These local-based filters are widely used in a simple and speedy way, and a basic image degradation model may be defined as follows.

$$I = x + n$$

Here, I denotes an image including textures, x denotes an ideal image, and n denotes noise. In addition, the local-based filter is applied in an image by the following equation.

$$S = F(I)$$

Here, S is an edge-preserving image, F is a filter such as a WMF, bilateral, and guided filter, and I is an input image. Although local-based filter methods may remove small textures and noises with a simple or repetitive filtering method, they are filtering methods using only local image statistical values, and therefore, there is a problem in that a phenomenon of edge area halo occurs, or a phenomenon of gradient reversal occurs in an area with no similar pixel values in the filtering area.

(2) Global-Based Image Quality Improvement

Global-based methods include methods such as ROF-TV, WLS, $\ell_0$-smoothing, and the like. Unlike the local-based methods, these methods remove noises and small textures by preserving edges using an optimization method. The WLS method provides a result of preserving the main edges by adjusting matrix affinities according to the gradient in an image. The $\ell_0$-smoothing method is a method of preserving edges using a term that counts the number of non-zero gradients in an image as a regularization term, and it shows excellent edge preservation performance, and is defined as follows.

$$C(S) = \#\{p \mid |\partial_x S_p^g| + |\partial_y S_p^g| \neq 0\}$$

Here, I denotes an input image, S denotes a result image, and $|\partial_x S_p|$ and $|\partial_y S_p|$ denote x and y direction gradients with respect to S. In the above equation, $\|C(S)\|_0$ is $|\partial_x S_p|+|\partial_y S_p|\neq 0$, and counts the number of components of which the sum of the x and y direction gradients is not 0. It can be redefined as a minimization problem as follows on the basis of this equation.

$$\min_S \left\{ \sum_p (S_p - I_p)^2 + \lambda C(S) \right\}$$

However, compared to the local-based methods, the global-based methods have problems in that they cannot preserve locally important edges, or the amount of computation increases due to global operations.

$$C(S) = \#\{p \mid \|\nabla S \neq 0\|\}$$

The problem of increasing the processing speed generated in the existing methods can be solved using a neural network that estimates h and v gradients used in an $\ell_0$-norm method, which is a global-based optimization method. As an existing global-based edge preservation method, there is $\ell_0$-norm smoothing defined by the following equation.

$$C(h_p^g, v_p^g) = \#\{p \mid |\partial_x S_p^g| + |\partial_y S_p^g| \neq 0\}$$

Here, I denotes an input image, S denotes a result image, and $|\partial_x S_p|$ and $|\partial_y S_p|$ denote x and y direction gradients with respect to S. In the above equation, $\|C(h_p^g, v_p^g)\|$ is $|\partial_x S_p|+|\partial_y S_p|\neq 0$, and counts the number of line segments of which the sum of the x and y direction gradients is not 0. It can be redefined as a minimization problem as follows on the basis of this equation.

$$\min_{S,S^g} \left\{ \sum_p (S_p - I_p)^2 + \left(S_p^g - I_p^g\right)^2 + \lambda C\left(h_p^p, v_p^g\right) \right\}$$

As the above equation is an $\ell_0$-norm regularization term and is non-linear, it is non-convex and non-differentiable. For this reason, the $\ell_0$-norm regularization term can be solved using a half-quadratic splitting $\ell_0$-norm minimization method, and a result $S_p$ of preserving edges can be obtained using the equation.

(3) Learning-Based Image Quality Improvement

Learning-based methods may provide a result of preserving edges through supervised and unsupervised learning of an artificial neural network configured of convolutions. This method has the advantage of overcoming the limitations of performance and computational complexity existing in the conventional local and global methods, and learns the neural network using the following loss function.

$$Loss = \frac{1}{N} \sum_{n=1}^{N} \|f(x, \theta) - y\|_2^2$$

6

Here, x denotes an input image, y denotes an image preserving edge, f(•) denotes an artificial neural network, N denotes the number of learning data, and θ denotes weight and bias parameters constituting the artificial neural network.

The present inventive concept proposes a gradient network (GNet) for preserving main edges in an image. The proposed method is for minimizing the gradients of image pixels, and each derivative for horizontal and vertical gradients should be minimized except in an critical edge area. The GNet proposed to solve this problem solves the problem of increasing the amount of computation by estimating $(h, v, \hat{h}, \widehat{v})$ as a network using a convolutional neural network. Hereinafter, it will be described in detail.

FIG. 1 is a perspective view showing an image quality improving device that performs an $\ell_0$ smoothing process based on deep gradient prior information to improve sharpness according to an embodiment of the present inventive concept.

The image quality improving device of the present inventive concept is a device for performing $\ell_0$ smoothing image quality improvement on the basis of deep gradient prior information to improve sharpness. Here, $\ell_0$ means only one step (one-step), not several steps.

Existing image smooth filters have high computational complexity due to optimization through iterative operations such as a weighted least squares algorithm, or L0 or L1-based gradient descent, whereas in the present inventive concept, a one-step smoothing process is performed.

The image quality improving device of the present inventive concept is a device equipped with an arithmetic processing unit such as a CPU, and a display panel such as a monitor, and may be implemented, for example, as a computer equipped with a monitor, a server equipped with a monitor, or the like as shown in FIG. 1.

The computer or the server includes program modules implemented through various types of languages such as C, C++, Java, Visual Basic, and Visual C in terms of software to perform various functions. In addition, they may be implemented using programs diversely provided according to the operating system such as DOS, Windows, Linux, Unix, Macintosh, or the like on general server hardware, and representatively, a website used in a Windows environment, an Internet Information Server (IIS), and CERN, NCSA, APPACH, or the like used in a Unix environment may be used.

Figure 2:
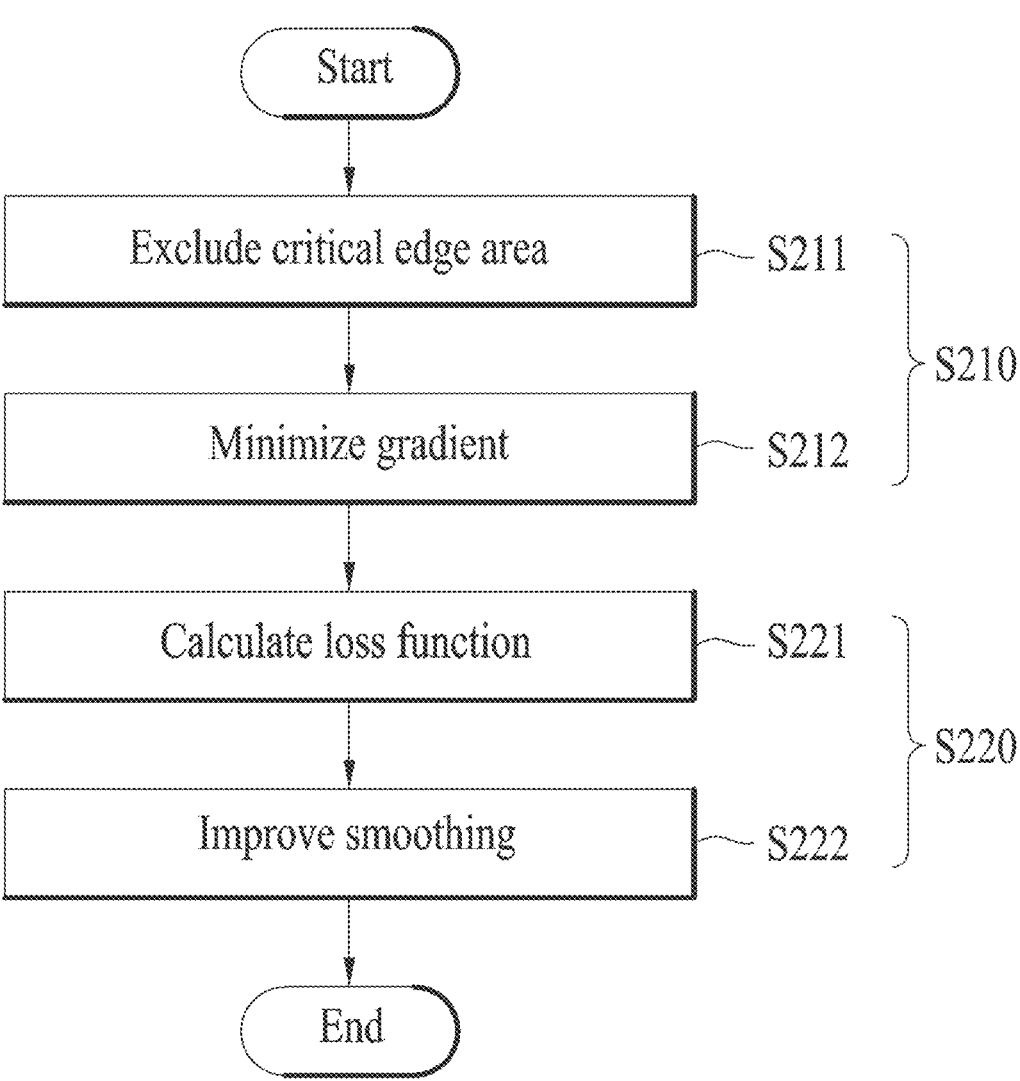
FIG. 2 is a flowchart illustrating an $\ell_0$ smoothing process performed on the basis of deep gradient prior information to improve sharpness according to an embodiment of the present inventive concept.
Figure 3:
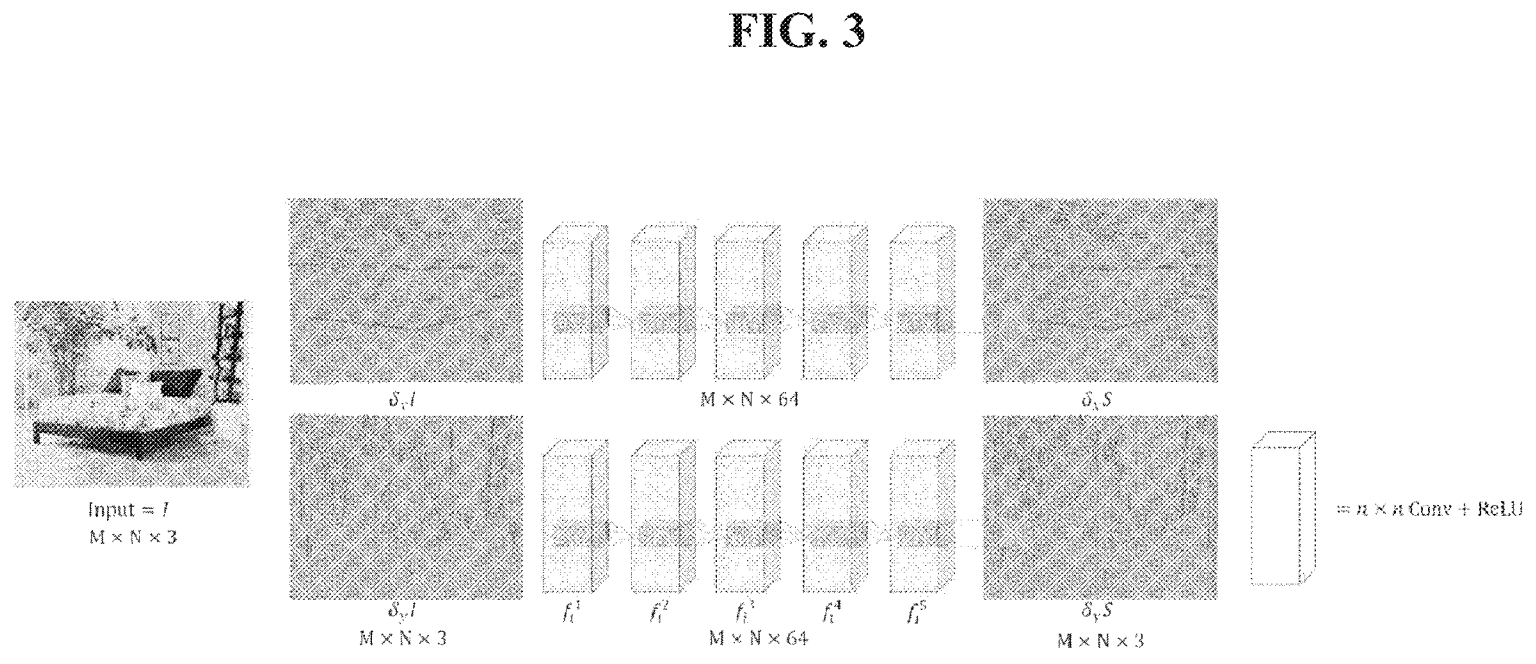
Figure 4:
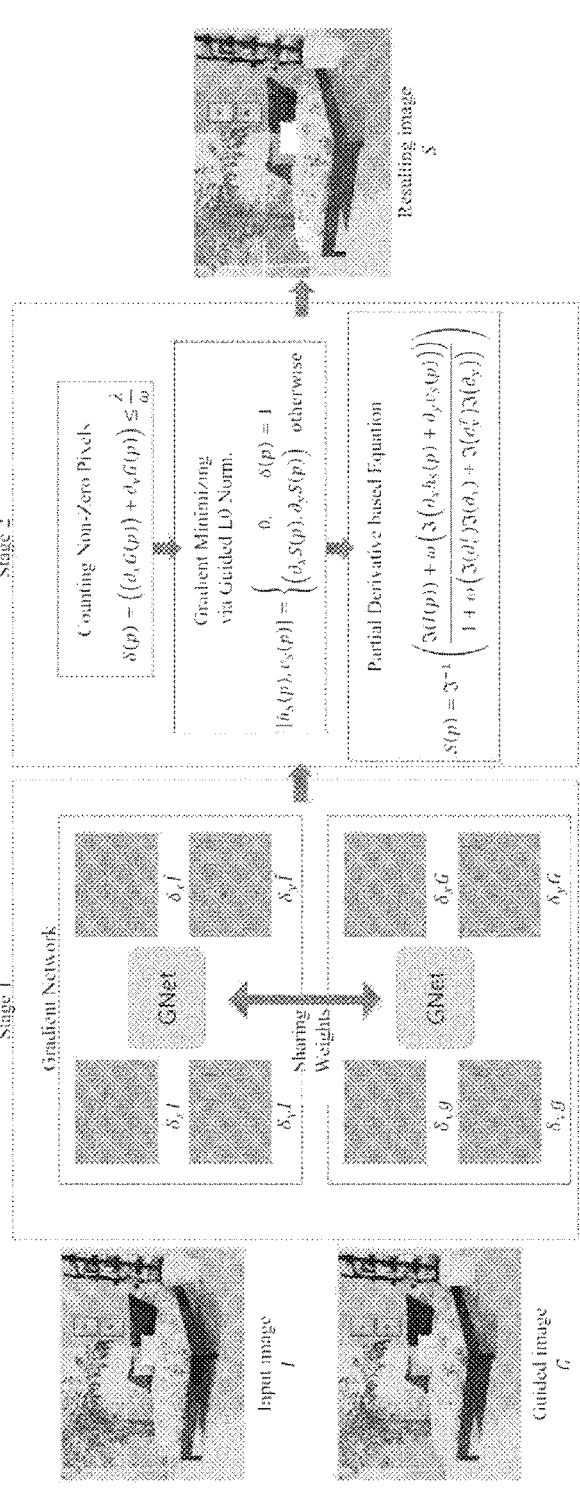
FIG. 4 is a view showing an example of smoothing process according to an embodiment of the present inventive concept.
Figure 5:
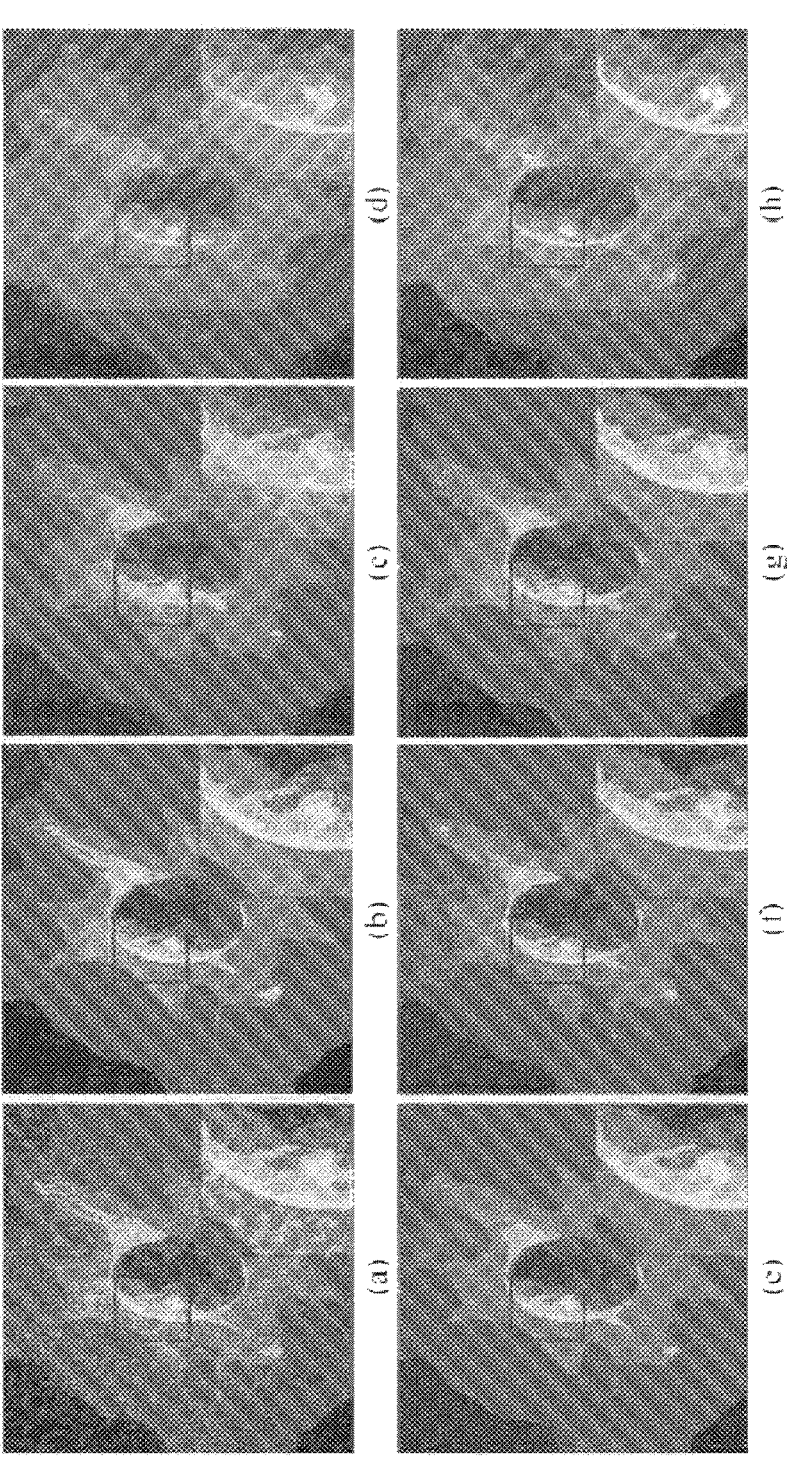
FIG. 5 is a view showing smoothing-processed exemplary pictures from which text is removed according to an embodiment of the present inventive concept.
Figure 6:
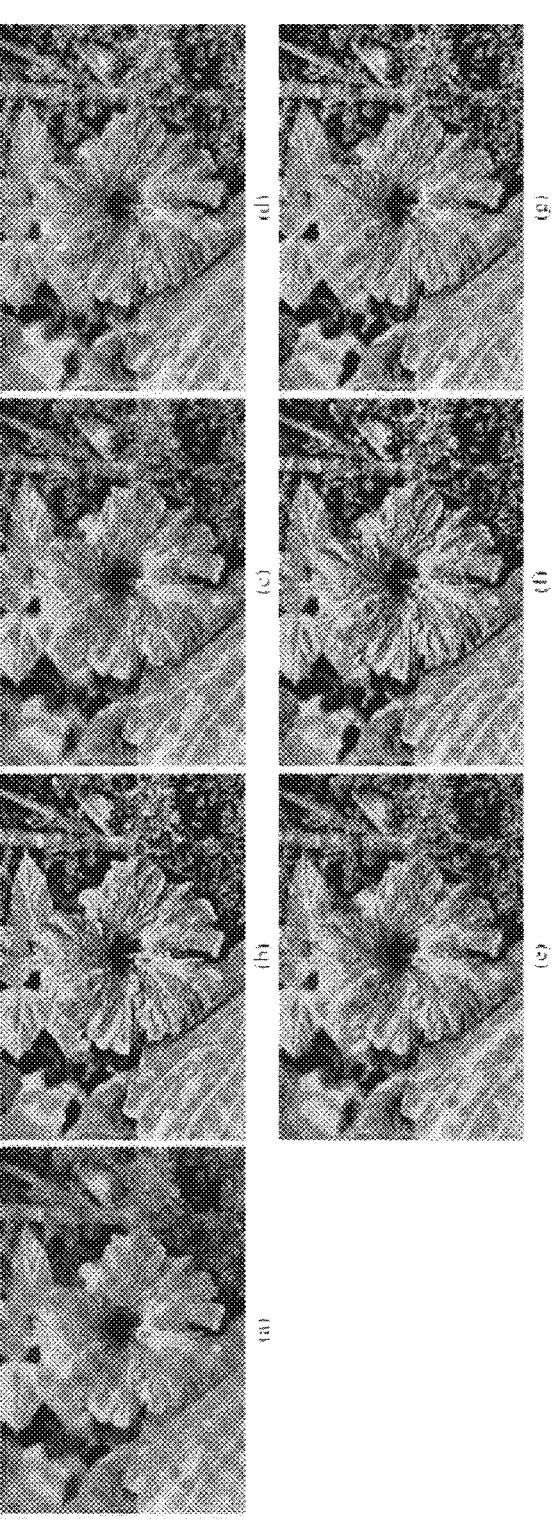
FIG. 6 is a view showing exemplary pictures with images of improved sharpness according to an embodiment of the present inventive concept.

FIG. 2 is a flowchart illustrating an $\ell_0$ smoothing process performed on the basis of deep gradient prior information to improve sharpness according to an embodiment of the present inventive concept. FIG. 3 is a view showing the GNet structure of the present inventive concept. FIG. 4 is a view showing an example of smoothing process according to an embodiment of the present inventive concept. FIG. 5 is a view showing smoothing-processed exemplary pictures from which text is removed according to an embodiment of the present inventive concept. FIG. 6 is a view showing exemplary pictures with images of improved sharpness according to an embodiment of the present inventive concept.

The $\ell_0$ smoothing method performed on the basis of deep gradient prior information to improve sharpness of an image of the present inventive concept may include, as shown in FIG. 2, a gradient-improved image generation step (S210) of generating a gradient-improved image by minimizing the gradients of pixels of an original image, by the image quality improving device; and a smoothing-improved image generation step (S220) of generating a smoothing-improved image smoothing-processed through one-step ($\ell_0$) estimation on the gradient-improved image, by the image quality improving device.

The gradient-improved image generation step (S210) is a step of generating a gradient-improved image by minimizing the gradients of pixels of an original image, by the image quality improving device.

The gradient-improved image generation step may include a step of exclude critical edge area (S211), and a step of minimize gradient (S212).

The step of exclude critical edge area (S211) is a step of excluding the critical edge area of an original image. Here, the critical edge area is a portion outside the boundary of a preset edge area of an image, and is preset as an area without the need of an image quality improving process.

The step of minimize gradient minimization (S212) is a step of minimizing a horizontal gradient and a vertical gradient using a GNet, which is a convolutional neural network, for an image excluding the critical edge area. Here, the GNet is a convolutional neural network configured of 3×3 convolution, 5×5 convolution, and Rectified Linear Unit (ReLU) filters. When f denotes an image layer, i denotes a layer before passing through the GNet, k denotes a layer after passing through the GNet, b denotes a bias, * denotes a convolution operator, and h denotes a weight, the gradient minimization step is performed by processing the formula of equation 1.

$$f_i^k = \text{ReLU}(b_i^k + \Sigma_j f_j^{k-1} * h_{i,j}^k)$$ [Equation 1]

Describing in detail, the GNet structure is as shown in FIG. 3. Here, f is the feature of a hidden layer, and $\partial$ is a partial differentiation function for extracting horizontal and vertical gradients.

The i-th feature map of the k-th layer passing through the GNet uses 3×3 and 5×5 convolutions and the Rectified Linear Unit (ReLU) as shown in the following equation. b and h denote a bias, a convolution operator, and a weight filter, respectively. For reference, the feature map refers to input/output data of a convolution layer as is known.

In order to extract texture information with comparatively low computational complexity, the size of the weight filters (h) of the first layer and the second layer is defined as 3×3, and the size of other layers is defined as 5×5. The reconstruction layer combines the feature maps as shown in [Equation 2] through a 3×3 convolution operation.

$$\text{Output} = b_i^6 + \Sigma_j f_j^5 * h_{i,j}^6$$ [Equation 2]

This network is configured of branch networks of a horizontal network and a vertical network. Horizontal and vertical gradients are involved in the extracted feature maps to analyze each network and input data. The loss function is defined as shown in [Equation 3].

$$\text{Loss}(\{h, v\}; \theta_*) =$$
$$\frac{1}{N} \sum_{n=1}^{N} \left\| GNet(h^i; \theta_h) + GNet(v^i; \theta_v) - (h_{gt}^i + v_{gt}^i) \right\|_2^2$$ [Equation 3]

The GNet returns a horizontal gradient and a vertical gradient, and $\theta$ is a parameter. $h_{gt}$ and $v_{gt}$ are the gradients of the ground truth.

Meanwhile, the smoothing-improved image generation step (S220) is a step of generating a smoothing-improved image smoothing-processed through one-step ($\ell_0$) estimation on the gradient-improved image. As is known, smoothing is frequently used to remove noise, and is used to blur an image or remove noise existing in an image. Smoothing is a method of determining the current position value of a result image using an average of the pixel value at the current position and the neighboring pixel values. When smoothing is applied to an image, it removes noise or connects broken edges, instead of reducing the sharpness.

The present inventive concept processes smoothing through estimation of step ($\ell_0$) performed on the smoothing-improved image, and includes a step of calculating a loss function, which is a function showing the difference between an original image and a gradient-improved image to calculate loss function (S221), and a step of generating a smoothing-improved image by reducing (e.g., minimizing) the loss function and improve smoothing (S222).

Hereinafter, an example of processing a smoothing-improved image will be described in more detail with reference to equations.

Existing image smooth filters have high computational complexity due to optimization through iterative operations such as a weighted least squares algorithm, or L0 or L1-based gradient descent. The proposed GNet may acquire deep gradient prior information, and generally, when it is combined with a loss function, optimal smooth image estimation is possible only by one-step estimation. The loss function for one-step L0 minimization is defined as shown in [Equation 4].

$$\min_{S, h_S, v_S} \|S - I\|_2^2 + \lambda\|h_G, v_G\|_0^0 + \omega\|\partial_x S - h_S\|_2^2 +$$ [Equation 4]
$$\omega\|\partial_y S - v\|_2^2 + \text{loss}(\{\partial_x S, \partial_y S\}; \theta_*) + \text{loss}(\{\partial_x G, \partial_y G\}; \theta_*)$$

S denotes an optimal smooth image, h* and v* are horizontal and vertical gradients minimized for both the target image (S) and the guide image (G). loss is the loss function of GNet. To minimize the loss function, the cost function is divided to be reconstructed as shown in [Equation 5].

$$\min_{h_*, v_*} \text{loss}(\{\partial_x S, \partial_y S\}; \theta_*) + \text{loss}(\{\partial_x G, \partial_y G\}; \theta_*)$$ [Equation 5]

Since the optimized loss function has already been acquired through a stochastic gradient descent method, the solution of the above objective function may be said to be the output of a previously trained GNet. That is, the gradient components $\partial_x S$, $\partial_x G$, $\partial_y S$, $\partial_y G$ are expressed as shown in [Equation 6].

$$\partial_x S = GNet(\partial_x I; \theta_v), \partial_x G = GNet(\partial_x g; \theta_v)$$

$$\partial_y S = GNet(\partial_y I; \theta_v), \partial_x G = GNet(\partial_y g; \theta_v)$$ [Equation 6]

Specifically, an image applied with Gaussian filtering is used as the guide image g. Since the minimized gradient components are estimated initially, the objective function of [Equation 4] may be more specifically formulated as shown in [Equation 7] using the L0 norm term while maintaining the gradient term.

$$\sum_{ph_*,v_*} \min\left((\partial_x S(p) - h_S(p))^2 + \partial_y S(p) - v_S(p))^2 \right. + \qquad \text{[Equation 7]}$$

$$\left. \frac{\lambda}{\omega} L(h_G(p), v_G(p)) \right)$$

The role of the counting function is to count and aggregate the number of non-zero gradients in the guide image. When $|h_G + v_G|$ is not 0, $L( )$ returns 1, and the following three conditions are satisfied.

$$\partial_x G(p) + \partial_y G(p) \leq \partial_x S(p) + \partial_y S(p) + \partial_x G(p) + \partial_y G(p) \leq \frac{\lambda}{\omega} \qquad \text{[Equation 9]}$$

$$\partial_x S(P) + \partial_y S(P) + \partial_x G(p) + \partial_y G(p) \geq 0 \qquad \text{[Equation 10]}$$

$$L(h_G, v_G) \neq 0 \text{ or } L(h_G, v_G) = 0 \qquad \text{[Equation 11]}$$

In the case of $L(h_G, v_G) \neq 0$, the gradient cost of objective function (8) is defined as shown in [Equation 12].

$$(\partial_x S(p) - h_S(p))^2 + (\partial_y S(p) - v_S(p))^2 + \frac{\lambda}{\omega} \geq \frac{\lambda}{\omega} \qquad \text{[Equation 12]}$$

However, the above condition is not established by the condition of [Equation 9]. Therefore, when the conditions of [Equation 9] to [Equation 11] are summarized, it is as shown in [Equation 13].

$$[h_S(p), v_S(p)] = \begin{cases} 0 & \delta(p) = 1 \\ (\partial_x S(p), (\partial_y S(p)) & \text{otherwise} \end{cases} \qquad \text{[Equation 13]}$$

Here, $\delta$ is a logical function and is defined as shown in [Equation 14].

$$\delta(p) = \begin{cases} 1 & (\partial_x G(p) + (\partial_y G(p))^2 \leq \frac{\lambda}{\omega} \\ 0 & \text{otherwise} \end{cases} \qquad \text{[Equation 14]}$$

To acquire a closed form solution based on partial differentiation, objective function [Equation 4] is finally defined as shown in [Equation 15].

$$\min_S \sum_p (S(p) - I(p))^2 + \qquad \text{[Equation 15]}$$

$$\omega(\partial_x S(p) - h_S(p))^2 + (\partial_y S(p) - v_S(p))^2$$

The result of the optimal smooth image S of the objective function [Equation 15] is as shown in [Equation 16].

$$S(p) = \Im^{-1}\left(\frac{\Im(I(p)) + \omega(\Im(\partial_x h_S(p) + \partial_y v_S(p))}{1 + \omega(\Im(\partial_x^T)\Im(\partial_x) + \Im(\partial_y^T)\Im(\partial_y))}\right) \qquad \text{[Equation 16]}$$

$\Im$ and $\Im^{-1}$ are fast Fourier transform and inverse fast Fourier transform, respectively. In addition, initialization is performed with $\omega = 100$ and $\lambda = 0.01$. FIG. 4 shows the proposed method in detail.

Meanwhile, FIG. 5 shows a result of smoothing performed using an NKS data set [6]. As shown in FIGS. 5(c) and (d), although the GUF and L0-smoothing methods successfully remove unnecessary textures, blurring occurs in the main edge area. FIG. 5(e) shows a result of removing textures, but color distortion is observed due to excessive removal. FIGS. 5(f) and (g) predict high-performance texture removal and fast-processing speed with a deep learning-based technique using FCN or VDCNN. However, there is a problem in that the speed is lowered as the image size increases. On the contrary, the proposed method removes textures without color distortion and maintains the fast-processing speed even when the image size increases.

As shown in FIG. 6(a), it is a method of showing an image of which the details are lost as the image is out of focus since it shows an image with loss of details. The processing method may be expressed as E=2I−S. Here, I denotes an input image, and S denotes a smooth image. FIG. 6 shows results of improving sharpness. It can be seen that although the images shown in FIG. 6(b) to (d) are improved as a result, there is a limitation in performance, and the results are evaluated as being unnatural, and although the images shown in FIGS. 6(e) and (f) are improved as a result, the colors are distorted due to excessive improvement. On the contrary, the present inventive concept may provide more natural results while improving details.

The embodiments in the above description of the present inventive concept are the most preferred examples selected among various possible implementations and presented to help understanding of those skilled in the art, and the technical spirit of the present inventive concept is not necessarily limited or restricted only by the embodiments, but various changes and modifications and equivalent other embodiments will be possible without departing from the technical spirit of the present inventive concept.

What is claimed is:

1. An $\ell_0$ smoothing method performed on the basis of deep gradient prior information to improve sharpness of an image by an image quality improving device, the method comprising:

a gradient-improved image generation step of generating a gradient-improved image by minimizing gradients of pixels of an original image, by the image quality improving device; and a smoothing-improved image generation step of generating a smoothing-improved image smoothing-processed through one-step ($\ell_0$) estimation on the gradient-improved image, by the image quality improving device, wherein the gradient-improved image generation step includes:

a critical edge area exclusion step of excluding a critical edge area of the original image; and a gradient minimization step of minimizing a horizontal gradient and a vertical gradient using a GNet, which is a convolutional neural network, for an image excluding the critical edge area.

2. The method according to claim 1, wherein the GNet is a convolutional neural network configured of 3×3 convolution, 5×5 convolution, and Rectified Linear Unit (ReLU) filters.

3. The method according to claim 1, wherein when f denotes an image layer, i denotes a layer before passing through the GNet, k denotes a layer after passing through the GNet, b denotes a bias, * denotes a convolution operator, and h denotes a weight, the gradient minimization step is performed by processing a formula of $f_i^k = ReLU(b_i^k + \Sigma_j f_j^{k-1} * h_{i,j}^k)$.

4. The method according to claim 1, wherein the smoothing-improved image generation step includes the steps of:

calculating a loss function, which is a function showing a difference between an original image and a gradient-improved image; and generating a smoothing-improved image by reducing the loss function.

* * * * *